US009503957B2

(12) United States Patent
Manchanda et al.

(10) Patent No.: US 9,503,957 B2
(45) Date of Patent: *Nov. 22, 2016

(54) LOW COST MESH NETWORK CAPABILITY

(71) Applicant: Microsoft Technology Licensing, LLC, Redmond, WA (US)

(72) Inventors: Alok Manchanda, Sunnyvale, CA (US); Taroon Mandhana, Redmond, WA (US); Jiandong Ruan, Medina, WA (US); Saurabh Mahajan, Cupertino, CA (US); Alireza Dabagh, Kirkland, WA (US); Thomas W Kuehnel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,380

(22) Filed: Oct. 13, 2015

(65) Prior Publication Data

US 2016/0037429 A1 Feb. 4, 2016

Related U.S. Application Data

(63) Continuation of application No. 14/262,094, filed on Apr. 25, 2014, now Pat. No. 9,185,627, which is a continuation of application No. 12/133,250, filed on Jun. 4, 2008, now Pat. No. 8,711,817.

(51) Int. Cl.
*H04W 4/00* (2009.01)
*H04W 40/02* (2009.01)
*H04W 84/18* (2009.01)
*H04W 92/02* (2009.01)

(Continued)

(52) U.S. Cl.
CPC .......... *H04W 40/02* (2013.01); *H04L 41/0803* (2013.01); *H04W 84/18* (2013.01); *H04W 92/02* (2013.01); *H04W 88/08* (2013.01)

(58) Field of Classification Search
USPC .................................................. 370/310-350
See application file for complete search history.

(56) References Cited

U.S. PATENT DOCUMENTS 6,314,525 B1  11/2001  Mahalingham et al.
6,470,397 B1  10/2002  Shah et al.
(Continued)

OTHER PUBLICATIONS

Adya, A. et al, "A Multi-Radio Unification Protocol for IEEE 802.11 Wireless Networks," (2003) http://pdos.csail.mit.edu/decouto/papers/adya03.pdf, (downloaded Feb. 20, 2008).
(Continued)

*Primary Examiner* — Afshawn Towfighi
(74) *Attorney, Agent, or Firm* — John Jardine; Judy Yee; Micky Minhas

(57) ABSTRACT

A wireless device that utilizes a single network interface to simultaneously connect to an infrastructure network and a mesh network. The device has a driver layer with a media access control module for each network type. A multiplexing module and transceiver module within the driver can direct received information associated with one of the networks to an appropriate media access control and then to an appropriate network adapter. For transmitted data, the multiplexing module can receive data from the application layer through an appropriate network adapter and route it to an appropriate media access control module for processing. The processed data can be interleaved by the transceiver for transmission.

20 Claims, 7 Drawing Sheets

(51) Int. Cl.
   *H04L 12/24* (2006.01)
   *H04W 88/08* (2009.01)

(56) References Cited

U.S. PATENT DOCUMENTS

| | | |
|---|---|---|
| 6,959,439 B1 | 10/2005 | Boike |
| 7,089,335 B2 | 8/2006 | Aiken et al. |
| 7,194,263 B2 | 3/2007 | Bahl et al. |
| 9,185,627 B2 * | 11/2015 | Manchanda .......... H04W 84/18 |
| 2003/0134614 A1 | 7/2003 | Dye |
| 2004/0044798 A1 | 3/2004 | Elzur et al. |
| 2004/0218580 A1 | 11/2004 | Bahl et al. |
| 2005/0078624 A1 | 4/2005 | Shu et al. |
| 2005/0254490 A1 | 11/2005 | Gallatin et al. |
| 2006/0013159 A2 | 1/2006 | Gurevich |
| 2007/0118742 A1 | 5/2007 | Abhishek et al. |
| 2008/0002701 A1 | 1/2008 | Droux et al. |

OTHER PUBLICATIONS

Bahl, et al., "MultiNet: Connecting to Multiple IEEE 802.11 Networks Using a Single Wireless Card," (2003); http://research.microsoft.com/research/netres/Kit/Publications/Papers/Mul-tiNet.pdf, (downloaded Feb. 20, 2008).

Chandra, R., "A Virtualization Architecture for Wireless Network Cards," (2006) http://research.microsoft.com/research/netres/projects/VirtualWiFi-/thesis.pdf, (downloaded Feb. 20, 2008).

* cited by examiner

LOW COST MESH NETWORK CAPABILITY

CROSS-REFERENCE TO RELATED APPLICATION

This application is a continuation of U.S. patent application Ser. No. 14/262,094 filed Apr. 25, 2014, entitled "LOW COST MESH NETWORK CAPABILITY", which is a continuation of U.S. patent application Ser. No. 12/133,250 filed Jun. 4, 2008, entitled "LOW COST MESH NETWORK CAPABILITY", now U.S. Pat. No. 8,711,817 issued Apr. 29, 2014. The entirety of each of these afore-mentioned applications is incorporated herein by reference.

BACKGROUND

With the advent of cheaper and more portable computers, the demand for wireless devices and networks is growing rapidly. The increasing popularity of wireless networks has led to the development of new methods and techniques to improve connectivity between portable/wireless devices and networks.

Wireless networks can generally be classified as two types. In the first type, called an infrastructure network, devices, such as computers or mobile phones, are connected to the network through access points, which are in turn connected together through the network. For two devices to communicate over an infrastructure network, both must be connected to an access point. The second type, called an ad-hoc network, is de-centralized. In an ad-hoc network, a set of wireless devices, herein referred to as nodes, interact directly and do not need to be connected directly to the access point. Instead, one node can connect to the network through another node that is already connected to the wireless network.

Mesh networks are a subcategory of ad-hoc networks. In mesh networks, nodes may receive and forward messages, allowing messages to be passed from node to node. As a result, mesh networks can be established over a relatively wide area. Additionally, because connections between nodes can be defined or adapted ad hoc, communication over the mesh network can continue despite communication failures between one or more of the nodes.

SUMMARY

Substantial functionality can be achieved by configuring a wireless device to provide a low cost means to communicate with an infrastructure network and a mesh network. The system has multiple media access control (MAC) modules, one associated with each network type within a driver for a network interface, allowing both network types to be supported using the same network interface hardware.

The MACs are abstracted in multiple network adapters, one for each supported network type. A transceiver may be included coupled between each MAC and the underlying hardware to interleave information for the multiple network types for transmission using the hardware. For received information, the transceiver may pass the information to a MAC appropriate for the network type over which it was received. The MAC can tag the information so that when it is directed to the appropriate network adapter.

Such an architecture may, more generally, be used to support communication over any two types of networks using the same radio. Accordingly, some aspects of the present invention are directed to a wireless device adapted to connect to a first network using a first protocol and a second network using a second protocol. The wireless device comprises a computer-readable medium having computer-executable instructions comprising: a radio; a computer-readable medium having computer-executable instructions comprising: a first interface to the first network and a second interface to the second network; a first media access control module adapted to control the radio in accordance with the first protocol; a second media access control module adapted to control the radio in accordance with the second protocol; and a multiplexing module adapted to selectively route messages between the first media access control module, the second media access control module and the first interface and the second interface for concurrent operation of the radio on the first network and the second network.

Another embodiment of the invention is directed to a method of operating a wireless device to communicate selectively over a first network and a second network. The method comprises acts of: A) configuring the wireless device, the configuring, comprising: configuring a first control module and a first component to receive data from the first network; configuring a second control module and a second component to receive data from the second network; B) receiving a first message, the receiving comprising: receiving data from the first network at the first control module and from the second network at the second control module; obtaining data from the first control module and the second control module; directing the data to either a first adapter or a second adapter based on the network over which the data was received; and C) transmitting a second message, the transmitting comprising: acquiring data to be transmitted from an application or a user-interface of the wireless device through the first adapter, the acquiring comprising encoding the data by assigning the data at least one tag; acquiring data to be transmitted from an application or a user-interface of the wireless device through the second adapter, the acquiring comprising encoding the data comprises assigning the data at least one tag; directing data to a selected control module of the first control module and the second control module, the selected control module selected based on a tag associated with the data; processing the data within the selected control module; and transmitting the processed data.

Another embodiment of the invention is directed to a computer-storage medium having computer-executable instructions adapted to control a wireless device for concurrent communication over at least two networks. The computer-storage medium comprises: a first interface to the first network and a second interface to the second network; a first media access control module adapted to control the radio in accordance with the first protocol; a second media access control module adapted to control the radio in accordance with the second protocol; and a multiplexing module adapted to selectively route messages between the first media access control module, the second media access control module and the first interface and the second interface for concurrent operation of the radio on the first network and the second network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings, like reference characters generally refer to the same parts throughout the different figures. Also, the drawings are not necessary drawn to scale, emphasis instead is placed upon illustrating the principles of the invention. In the drawings.

DETAILED DESCRIPTION

Figure 1:
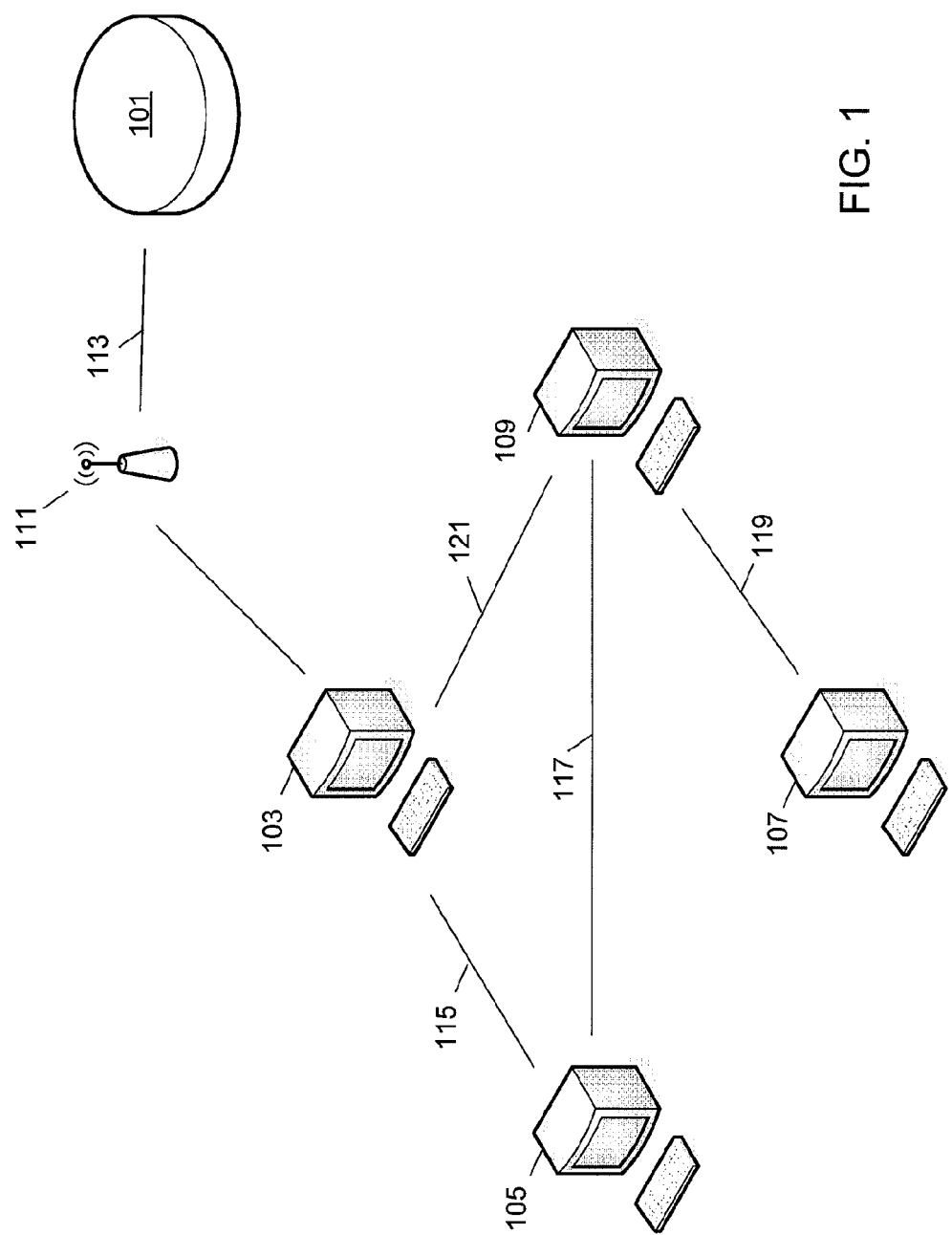
FIG. 1 illustrates an example of a wireless device simultaneously connected to an infrastructure network and a mesh network.

The inventors have recognized and appreciated that substantial functionality for a computer and a system of computers can be achieved at low cost by enabling the computer or computers in the system to concurrently support a mesh network adapter and an ad hoc network adapter for communication with a single radio.

Multiple computers with such a configuration can cooperate to effectively extend the range of a wireless access point with relatively little infrastructure. Those computers within range of an access point may connect directly to a network through the access point. Those computers out of range of the access point may use their wireless radios to form a mesh network, including one or more of the computers in range of the wireless access points. A computer within range of the wireless access point may act as a bridge, enabling those computers in the mesh out of range of the wireless access point to nonetheless achieve a network connection to the infrastructure network.

As a specific example, such a network will greatly enhance the range and ability for many students in remote locations with little network infrastructure to achieve Internet connectivity. A first student's laptop can connect to a second student's laptop, which can connect to a third student's laptop, which may be directly connected to a wireless access point that provides Internet connectivity. Even though the first and second students' laptops may be out of range of the access point of the network, both will still be connected to the network due to the connection with the third student's laptop. In this way, the need for multiple wireless access points is avoided, yet network connectivity is provided over a much greater area than can be serviced by a single wireless access point.

Embodiments of the invention are described as being implemented in a suitable computing environment. Although not required, embodiments of the invention will be described in the general context of computer-executable instructions, such as program modules, being executed by a personal computer. Generally, program modules include routines, programs, objects, components, data structures, and software layers that perform particular tasks or implement particular abstract data types. Those skilled in the art will appreciate that embodiments of the invention may be practiced with numerous other general purpose or special purpose computing system environments or configurations. Examples of well known computing systems, environments, and/or configurations that may be suitable for use with embodiments of the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like. Embodiments of the invention may also be practiced in distributed computing environments where tasks are performed by remote processing devices that are linked through a communications network. In a distributed computing environment, program modules may be located in both local and remote memory storage devices.

In view of the many possible embodiments to which the principles of this invention can be applied, it will be recognized that the embodiments described herein with respect to the drawing figures are meant to be illustrative only and are not be taken as limiting the scope of invention. For example, those of skill in the art will recognize that the elements of the illustrated embodiments shown in software can be implemented in hardware and vice versa or that the illustrated embodiments can be modified in arrangement and detail without departing from the spirit of the invention. Therefore, the invention as described herein contemplates all such embodiments as can come within the scope of the following claims and equivalents thereof.

FIG. 1 illustrates one embodiment of the invention in which a wireless device is simultaneously connected to a mesh network and an infrastructure network. The device shown in this example is a computer 103, which is connected to a plurality of wireless devices, namely computers 105, 107, and 109, to form a mesh network. One of skill in the art can appreciate that mesh networks can be formed with a number of wireless devices, such as portable computers, mobile phones or other portable devices, and are not restricted by any means to a number of users or a geographical location. Thus, the depiction of devices in FIG. 1 is illustrative of the types of devices that may be connected in a network.

The computers 103, 105, 107, and 109 are connected with each other wirelessly through links 115, 117, 119, and 121. Such links may be established using wireless radio hardware, as is known in the art, or with any other suitable hardware. The hardware may be controlled to implement communications between devices in accordance with an ad hoc network protocol as is known in the art. However, any suitable protocol may be used.

Such hardware in one or more of the devices also may be controlled to operate according to methods described in more detail below to also connect to an infrastructure network. In this example, computer 103 is wirelessly connected via link 113 to an infrastructure network 101 through an access point 111. An example of an infrastructure network may be the Internet or a corporate Intranet in an office. Those of skill in the art can appreciate that an infrastructure network is not limited by any means to an office network or the Internet, but can exist in any geographical location provided there is an access point to connect to the infrastructure network.

Each device connected to a mesh network may have an operating system (OS), which provides functional and management support for software applications running on the device. The support may include managing network operations, network connections, network configurations, memory control and allocation, user-interfaces, input/output components, and other functions that are known to one of skill in the art. In the example disclosed in FIG. 1, the device is a computer 103. Contemporary OSes for computers include the Linux®, Solaris®, Unix®, Mac OS® X, and Microsoft® Windows® operating systems. Techniques used for implementing such known operating systems may be used to implement an operating system providing functionality as described herein. However, any suitable techniques may be used.

Figure 2:
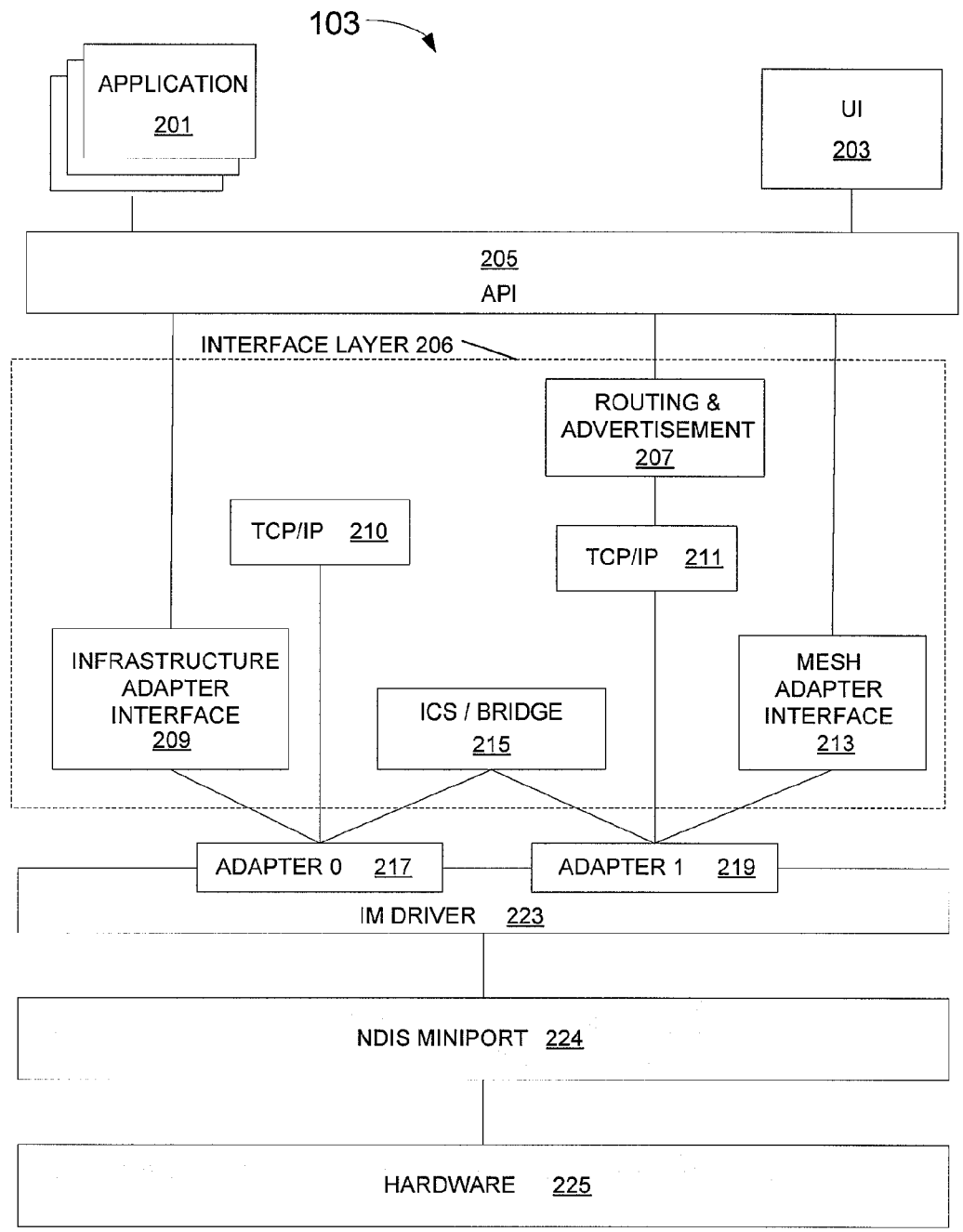
FIG. 2 is a block diagram illustrating software and hardware components of a wireless device related to connecting and managing connections to multiple networks, according to some embodiments of the invention.

FIG. 2 illustrates an example architecture for a computer, such as computer 103, configured to support concurrent communication using different protocols. The architecture of FIG. 2 illustrates that an operating system of a computer may be configured to expose adapters to different networks using different protocols, even though both are implemented using the same hardware 225.

Hardware 225 may contain a transmitter/receiver to support wireless communication. In the embodiment illustrated, hardware 225 may be a wireless network interface card implemented as is known in the art. Such a transmitter/receiver may be controllable to perform transmit and receive operations appropriate for a specific network protocol to be implemented. In this way, the same transmitter/receiver may be used to support communications over more than one type of network. In the illustrated embodiment, multiple network connections to different types of networks may be maintained concurrently using the same transmitter/receiver.

In the example of FIG. 2, application level components, such as application programs 201 or a user interface 203, generate or consume data communicated using such a transmitter/receiver. In the embodiment illustrated, each of the application level components need not be specifically configured for operation with a computer that is configured to support communication using different protocols. Rather, the application programming interface (API) layer 205 provided by an operating system on the computer may provide interfaces for each supported network. Each component at the application level may interact through API 205 as in a computer interacting with a single network type as is known in the art.

API layer 205 may interact with an interface layer 206, which provides an interface to one or more driver layers where control of hardware 225 may be implemented. Interface layer 206 may format commands and data provided through API layer 205 specifically for operation in a system configured for access to multiple network types and such formatting may reflect the specific network type to which such commands and data relate.

In the embodiment illustrated, the driver layer is implemented with an Intermediate (IM) driver 223 and an NDIS miniport driver 224. An NDIS miniport driver 224 may be implemented to specifically control functions of hardware 225 and, for example, may be implemented by the developer of hardware 225. It may expose an interface in a known format, such as NDIS, through which it may interact with other elements of the computer system.

More general control functions may be implemented in the IM driver 223. In this example, the functions implemented in IM driver 223 are not hardware dependent and IM driver 223 may be implemented by an OS vendor and provided as part of an OS or acquired from any other suitable source.

One function provided by IM driver 223 is to expose adapters associated with each supported network type. In the example illustrated in which an infrastructure network and a mesh network are supported, IM driver 223 exposes an infrastructure network adapter 217 and a mesh network adapter 219. In the embodiment illustrated, even though the network functionality associated with each adapter is provided by the same hardware 225, each adapter may present an interface in a format as known for different networks implemented using separate hardware components.

The interface layer 206 translates functions between the application programming interface layer 205 and the adapters 217 and 219 exposed by the driver components. In the embodiment illustrated, the interface layer 206 includes several modules to process mesh network and infrastructure network functions independently. An infrastructure adapter interface 209 manages and formats information relating to an interface network that is transmitted between the infrastructure adapter 217 and the API layer 205. Similarly, a mesh adapter interface 213 manages and formats information communicated between the mesh network adapter 219 and the API layer 205. Though not expressly shown, API layer 205 may also be partitioned so that one part of the API layer manages communications with the infrastructure network and the other part manages communications with the mesh network. However, any suitable partitioning of the illustrated components may be used.

Connected to the two adapters 217 and 219 is an Internet Connection Sharing (ICS)/Bridge module 215. The ICS/Bridge module 215 manages information being transmitted to wireless devices in a mesh network from wireless devices in an infrastructure network and vice versa. The ICS/Bridge module 215 can direct information according to hardware-assigned MAC addresses.

As described in greater detail below, the driver layers of the architecture of FIG. 2 are configured such that each network adapter may be active simultaneously to support simultaneous network connection that can concurrently communicate over multiple networks, even though only a single radio may be present. This capability allows computer 103 to be configured as a bridge. In operation, ICS/Bridge module 215 may relay information received through one network adapter for transmission through another network adapter. In this way, ICS/Bridge module 215 establishes a bridge between two networks.

The interface layer 206 also provides the necessary communication protocols for communicating over multiple networks. Protocol modules, such as the Transmission Control Protocol/Internet Protocol (TCP/IP) modules 210 and 211 and a Routing and Advertisement module 207, are known in the art and can be integrated into the interface layer. Two separate TCP/IP modules, an infrastructure network TCP/IP module 210 and another mesh TCP/IP module 211 can provide networking and name resolution protocols. The Routing and Advertisement protocols provide the infrastructure for assigning Layer 3 addresses such as IP, router, and Domain Name System (DNS) server addresses. A Dynamic Host Configuration Protocol (DHCP) client and/or server, known to one of skill in the art, provides the above-mentioned functionality. In addition, service protocols such as Universal Plug and Play (UpnP) and Web-Services are either transmitted or received.

As mentioned above, information, whether control information or data for transmission, provided by the application programs 201 and the interface layer 206 may be sent to the hardware 225 via the IM driver 223 and the NDIS miniport module 224.

Figure 3:
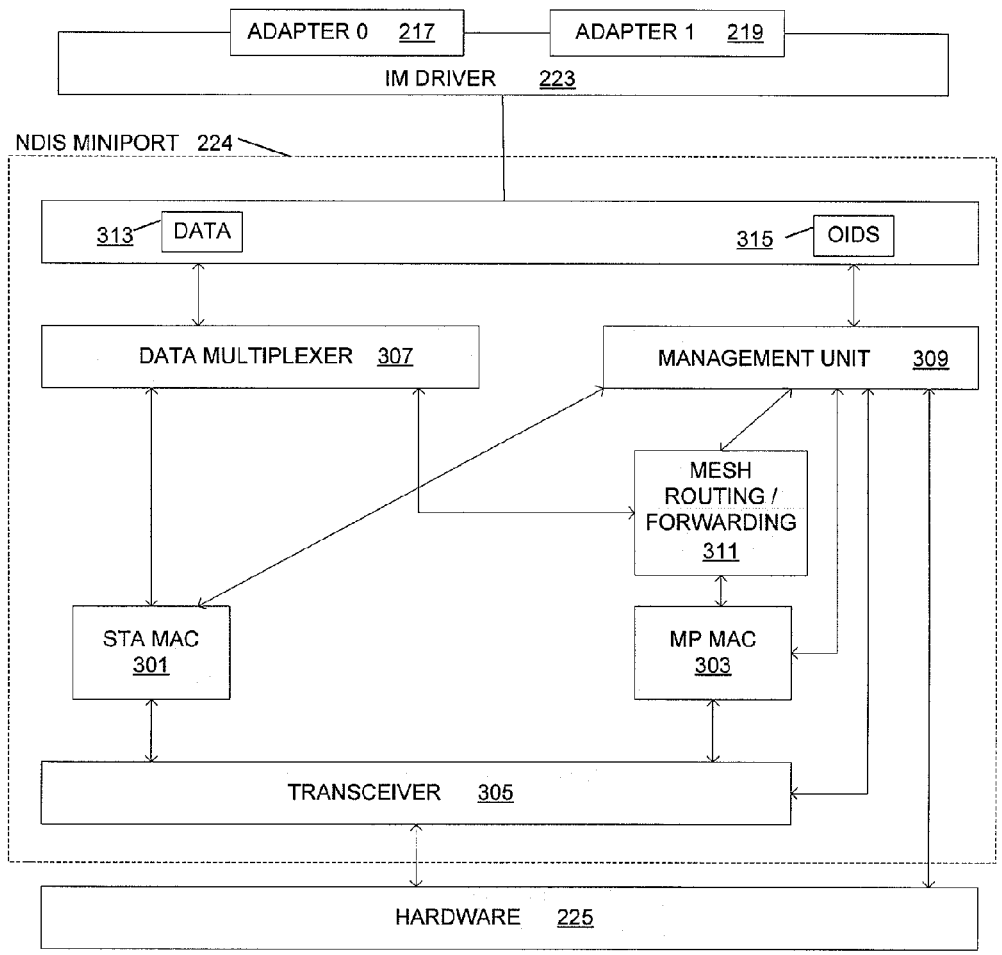
FIG. 3 is a block diagram illustrating the components within a Network Driver Interface Specification (NDIS) miniport driver, according to some embodiments of the invention.

FIG. 3 shows components of the NDIS miniport module 224, which may be included in some embodiments. As illustrated, these components may include components to implement functions associated with each supported network type. For example, the NDIS miniport module 224 can receive and transmit data from the wireless device to an access point in the infrastructure network or other nodes in the mesh network using a transceiver 305 connected to the hardware 225. The transceiver is capable of sending and receiving data packets simultaneously and can simultaneously communicate with multiple nodes in the infrastructure network and/or mesh network. A transceiver may be implemented partially in software and partially in hardware. An example of a transceiver may be a radio device or a universal serial bus (USB) stick.

In some embodiments, the transceiver 305 can be connected to two MACs, each MAC being a software module that implements functions associated with network controls known to one of skill in the art. MACs can be programmed to execute instructions independently or to depend on the functionality of another MAC in the NDIS miniport layer 224. In the embodiment illustrated, a Station (STA) MAC 301 executes addressing/access controls and protocols to connect to an access point in the infrastructure network. A Mesh Point (MP) MAC 303 executes addressing and access controls and protocols to connect to nodes in the mesh network.

In the embodiment in which a single radio is provided, a datagram, such as a packet, received over either network will received by transceiver 305. The packet may operate on only the network connection over which it was received. Any suitable mechanism may be used to ensure that each received packet is processed in connection with the network over which it was received. For example, when transceiver 305 receives a packet, access protocols in the STA MAC 301 and the MP MAC 303 may determine using header or other packet information whether the packet was received from the infrastructure network or the mesh network. Each MAC may then process the packet only if it relates to its network. Alternatively, transceiver 305 may analyze the packet to determine the network over which the packet was transmitted and direct the packet to the appropriate MAC. Though, any suitable mechanism may be used to ensure packets associated with different networks are processed in components adapted for processing packets for those networks.

Each MAC may recognize when a received packet contains data or command packets to be provided to higher levels of the networking stack. If a received packet, regardless of which network over which it is received, contains data, the packet may be provided to data multiplexer 307.

Each MAC may provide data in conjunction with a tag that indicates the network over which that data was received. A tag may be any suitable identifier or indicator associated with data. The tag may be in a packet header, a container for data, stored in a data structure associated with data or represented in any other suitable way. The tags may be closely linked with the data or may be supplied separate from the data. For example, a tag may be specified as a setting for data multiplexer 307 that is provided by control logic or from another source. Moreover, in some embodiments, one tag may be associated with more than one packet. As an example of such an embodiment, a setting may be specified for data multiplexer 307 that is applicable to multiple packets or applicable for a defined period of time. Thus, the specific mechanism by which a tag is specified is not critical to the invention and any suitable mechanism may be used.

Regardless of the manner in which a tag is specified, multiplexer 307 can direct data 313 to the appropriate portions of IM Driver 223 such that the data 313 is provided through an adapter associated with the network over which the data 313 was received. Received data 313 can then be processed as is known in the art, such as through TCP/IP protocol modules 210 or 211, if the network over which the data 313 was received operates according to the TCP/IP protocol.

In embodiments in which some or all of the command packets received over a supported network are not consumed within the MAC associated with the network, those command packets may also be provided to higher levels of the network stack through data multiplexer 307, or any other suitable component. As with data packets, the command packets can be tagged so that data multiplexer 307 or other suitable multiplexer component can appropriately direct the packets for processing.

Multiplexer 307 can perform a converse function for data 313 or command packets generated at higher levels of the network stack. Data multiplexer 307 may receive data 313 or command packets for transmission over a network and, based on a tag associated with that information, route the information to a MAC associated with the network with which the data 313 is associated. For example, when transmitting a data packet from computer 103 to an external node in the mesh network, the multiplexer 307 will receive the data packet and direct it to the MP MAC 301 based on tags associated with the data packet.

Other components may also be included for processing received information associated with each network. In embodiments in which a mesh network is implemented, for example, a mesh routing/forwarding module 311 may be included to manage transmitted and received packets in the mesh network. For mesh protocols in which a device that is part of a mesh may receive and forward packets, mesh routing/forwarding module 311 can track multiple connections of the wireless device to other devices in a mesh network. Upon receipt of a packet, mesh routing/forwarding module 311 can determine whether the packet is to be forwarded to another device in the mesh network. If so, mesh routing/forwarding module 311 can apply the packet to the MP MAC 303 and the transceiver 305 where the packet may be forwarded to another node in the mesh network. In such a scenario, the wireless device serves as a transit node for communications between a source and a destination node in the infrastructure or mesh networks.

The driver layers may also include components to implement control functions. In the illustrated embodiments, commands that control operation of the network interface, including miniport driver 224 and hardware 225, may be specified as command objects, sometimes called Object Identifiers (OIDs) 315. Miniport driver 224 may include a component, such as management unit 309, to respond to such commands. The management unit 309 can synchronize and control the modules in the NDIS miniport layer 224. Management unit 309 may process each OID 315 and, in response generate appropriate control information to other components.

OIDs 315 can be generated in the OS and can command the management unit 309 to perform functions, such as to report the capabilities and capacity of the NDIS miniport 224 to handle communications with the infrastructure and mesh networks. OIDs 315 processed by management unit 309 may include OIDs as are known in the art for any of the MACs supported. In response to such OIDs 315, management unit 309 may identify the appropriate MAC for processing such an OID 315 and apply the OID 315 to the MAC for processing as is known in the art. Management unit 309 can also process OIDs 315 that facilitate simultaneous connection over more than one network. To facilitate simultaneous connectivity to the infrastructure and mesh networks using a single transceiver, a number of new OIDS can be defined according to some embodiments of the present invention. A list of some of the OIDS related to mesh networks is provided in Table I.

TABLE I

Mesh-Related OIDS

| Name | Description |
| --- | --- |
| MESH_MAC_LIST | Determines the number of MACs supported by the miniport |
| MESH_MAC_CAPABILITY | Determines the capabilities of the MACs (one or more) supporting the Mesh network |
| MESH_ROUTING_TABLE | Queries and sets the Independent Hardware Vendor (IHV) specific mesh routine table |
| MESH_MAC_ROLE | Configures operations for a miniport MAC and resets the MAC being reconfigured |
| MESH_CONNECT | Requests mesh MAC to connect to the mesh network |
| MESH_CONNECT_PARAMS | Determines the connection parameters to the mesh network |
| MESH_ASSOCIATION_STATUS | Determines the status of Mesh MACs associations with other mesh network nodes |
| MESH_CONFIGURATION_PARAMS | Configures traffic parameters for transmission and receiving packets in the mesh network |

The OIDS listed in Table I and other supported OIDs may be called by the OS to optimize and configure the NDIS miniport settings. The OIDS can be specific to a MAC, all MACs connected to a specific network, or all the MACs present in the wireless device. In some embodiments, the calling of OIDS to reset or reconfigure a MAC does not interfere with the operations of the other MACs. As another example, a MESH_CONNECT OID may not initiate a connection to an existing mesh network or start a new mesh network before the MESH_CONNECT_PARAMS OID has been called. Several combinations or sequence of OID calls are possible. Furthermore, it should be appreciated that several other OIDS not listed in Table I can be defined to facilitate wireless connectivity in mesh networks.

Figure 4:
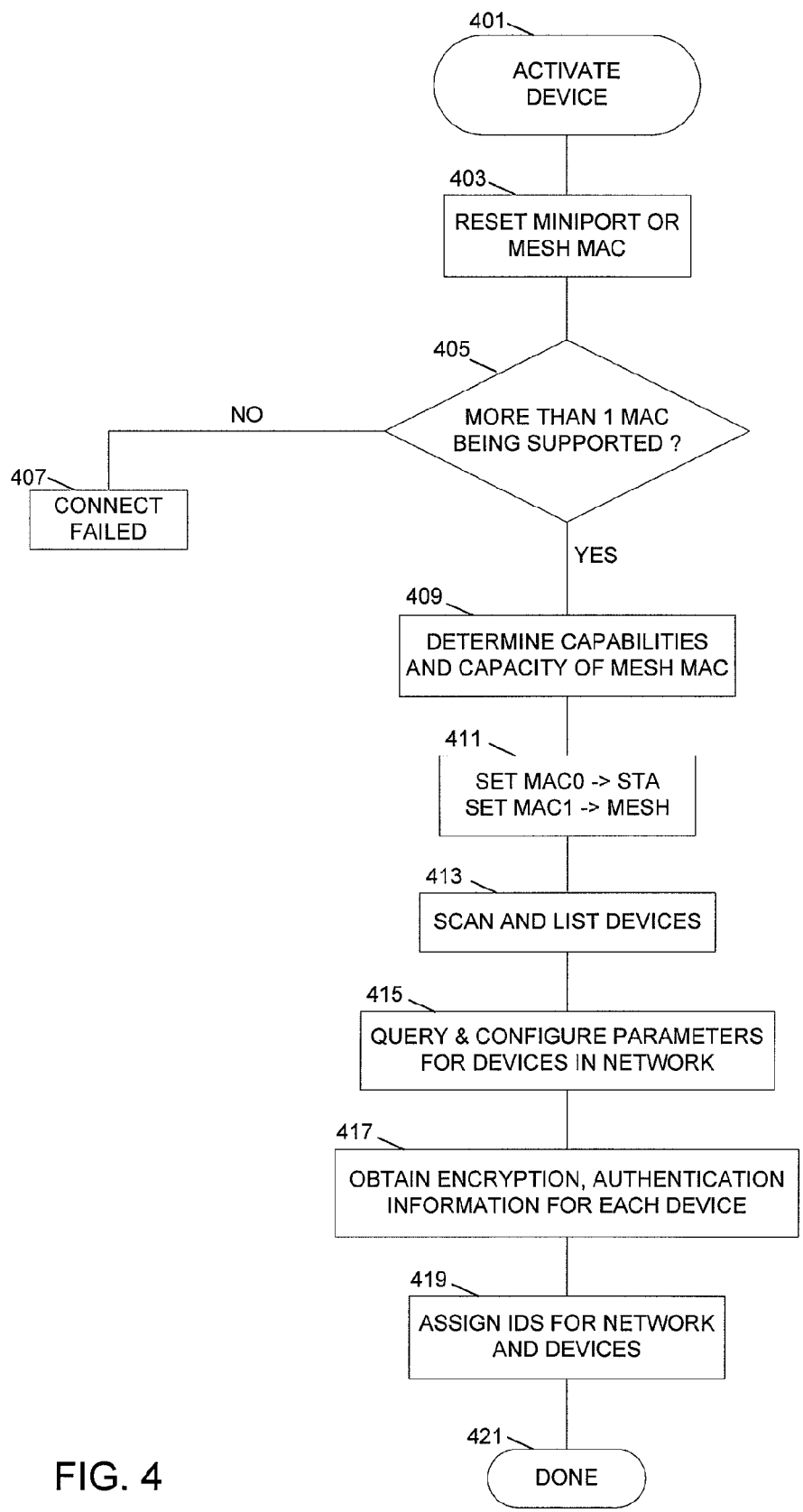
FIG. 4 is a flowchart illustrating an example of a method used by a wireless device to connect to a mesh network, according to some embodiments of the invention.

FIG. 4 discloses a sequence of calls that can be made from the OS to various OIDs to establish connection between a device like computer 103 to a mesh network while ensuring connection to the infrastructure network is not harmed. These OIDs may be generated in response to actions initiated within application level components. For example, an OS may generate OIDs in response to a user requesting a network connection through a user interface. Accordingly, the sequence of OIDs depicted in FIG. 4 is illustrative of processing that may be performed in one scenario and is not intended as an exhaustive description of functions that can be performed.

After activating or starting a device 103 at step 401, in the first step 403, the OS of device 103 may reset its miniport or Mesh MAC with a first OID. Using a second OID, the OS may check how many MACs are currently being supported 405. If no MAC or only one MAC is being supported 407, then device 103 will not be able to connect to the mesh network. However, if two or more MACs are detected, the OS invokes a third OID 409 to determine the capability and capacity of a MAC that will be used for the mesh network. Using a forth and a fifth OID 411, the OS sets one MAC to communicate with the infrastructure network and another MAC to communicate with the mesh network. Next 413, the OS scans the area or network for a list of all the devices operating in the mesh network by calling a sixth and a seventh OID. If no mesh network is detected, the OS may create a new mesh network. An eighth OID 415 may be employed to query and obtain configuration parameters of devices in the mesh network. The encryption and authentication information is obtained and set for the devices in the mesh using two more OIDs 417. Finally after assigning IDs to the mesh network and to each device in the mesh network using another two OIDs 419, the OS invokes a last OID 421 to connect device 103 to the mesh network.

Other sequences of OIDs may be used to configure a miniport driver for communication in other scenarios. Regardless of the specific sequence of OIDs, once configured to support two MACs, a computer may communicate over two networks concurrently using the same radio.

Figure 5A:
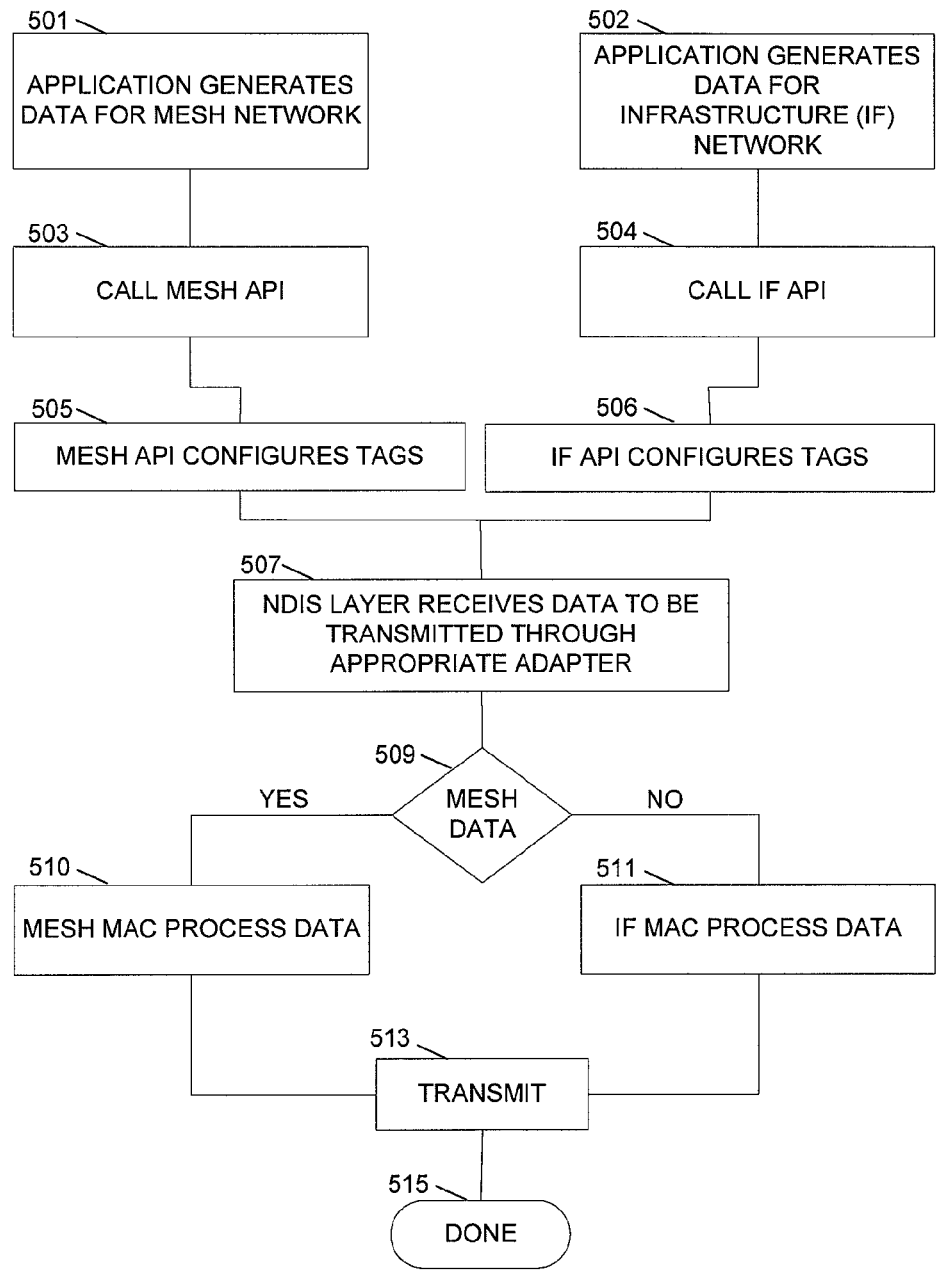
FIG. 5A is a flowchart illustrating an example of a method used by a wireless device to concurrently transmit data to a mesh network and an infrastructure network.

FIG. 5A describes a method of transmitting packets from computer 103 to the mesh network and infrastructure network simultaneously according to one embodiment of the invention. In this embodiment, data to be transmitted 501/502 can be inputted from the user through a user-interface 203 or generated by an application 201. Based on the adapter used by the application level component through which the generated data 313 is provided, the packet to be transmitted is to be directed to the mesh network or the infrastructure network. Accordingly, depending on the network, the application component calls 503/504 an API within API module 205 to configure the data packets for the appropriate adapter. The API module 205 can configure tags associated with the data 313 to specify the network over which the data is to be transmitted. For example, data generated by a first application may need to be sent to a user in the mesh network whereas data generated by a second application may need to be transmitted to a user in the infrastructure network. The API module 205 will configure the data from the first application with a tag directing it to the mesh network and the data from the second application with a tag directing it to the infrastructure network in steps 505 and 506.

After configuring the data in the API module 203, data 313 may be routed in step 507 to the appropriate adapter in the IM driver 223 and subsequently to the NDIS module 224. For example, packets with tags indicating data to be transferred to the infrastructure network will be routed to adapter 217 whereas packets with tags indicating data to be transferred to the mesh network will be routed to adapter 219. In step 509, the multiplexer 307 uses information contained in the tags and out-of-band data to determine if a packet is directed to the mesh network. If a determination is made that the packet is destined for the infrastructure network, the packet will be sent 511 to the STA MAC 301. Similarly packets for the mesh network will be directed 510 to the MP MAC 303. Subsequently, the packets are transmitted in step 513 to the appropriate network through the transceiver 305.

In the embodiment illustrated, processing at block 513 may entail interleaving data for the different supported networks such that concurrent operation of two or more network connections is achieved. In some embodiments, a component, such as transceiver 305 (FIG. 3), may buffer information for transmission received from one network MAC while transmitting information from another network MAC. The buffering may be implemented so that data is transmitted in the order in which it is received at transceiver 305. However, other implementations are possible. For example, information associated with one of the networks may be given priority. Priority may be defined in any suitable way. For example, priority may be defined a priori based on network type or may be defined dynamically in response to OIDs 315 or other commands applied to miniport driver 224 in response to user input or execution of an application.

Prioritization can also be achieved at other locations within NDIS miniport driver 224. For example, data multiplexer 307 may alternatively or additionally implement prioritization.

Figure 5B:
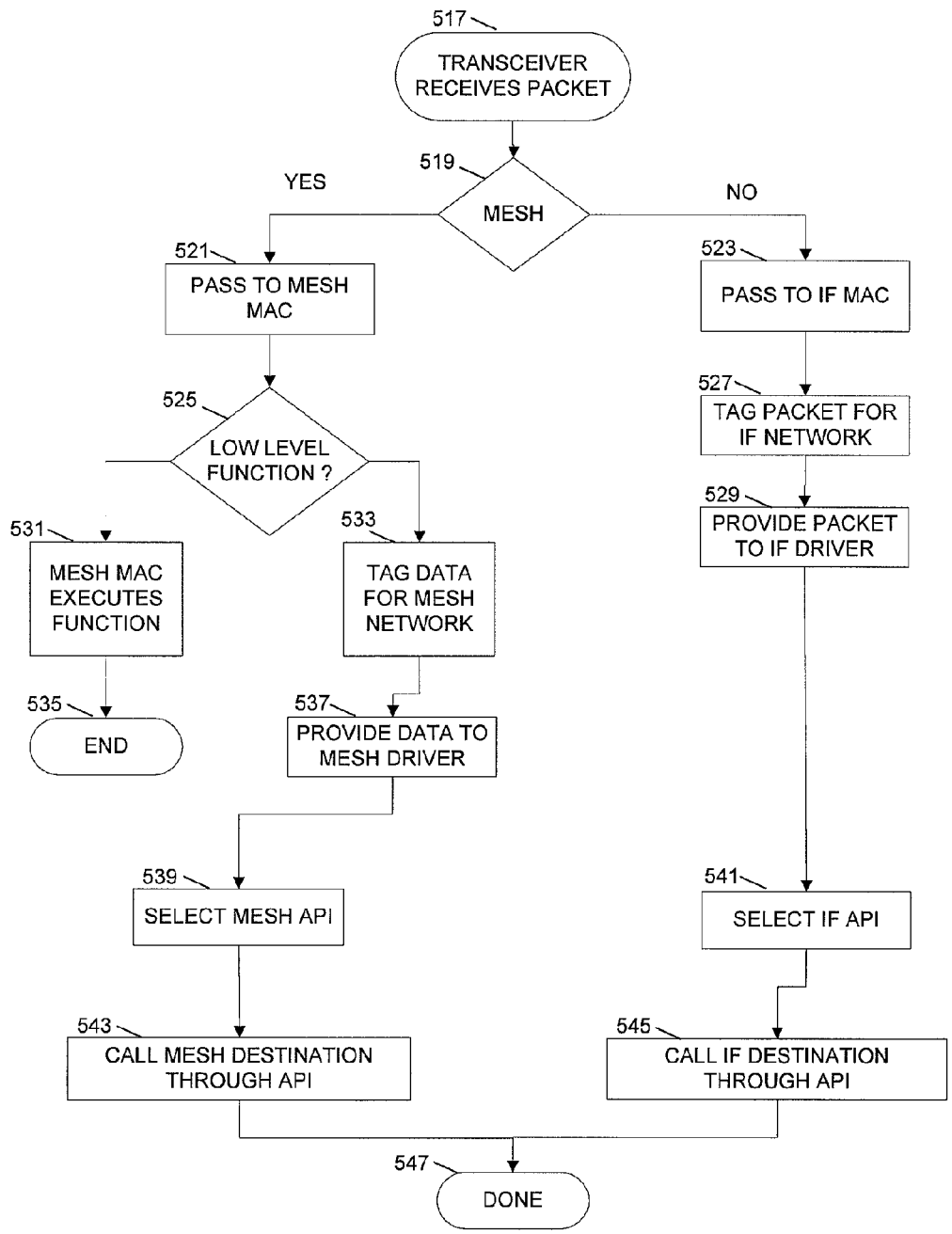
FIG. 5B is a flowchart illustrating an example of a method used by a wireless device to concurrently receive data from a mesh network and an infrastructure network.

When information is received over a supported network, a converse process may be performed to direct the data to the appropriate component. FIG. 5B describes a method of processing packets that have been received 517 on computer 103 through transceiver 305 in accordance with an embodiment of the invention. A destination address carried in the headers and other identifying characteristics such as overall packet format associated with a received packet can help the transceiver 305 determine whether the packet originated from a node in the mesh network or the infrastructure network 519. Packets from the infrastructure network will be directed 521 to the STA MAC 301 and packets from the mesh network will be directed 523 to the MP MAC 303 for further processing.

The MP MAC 303 can extract instructions contained in the packet and determine if any low-level functions need to be executed 525. Low-level functions include and are not limited to routing, network connectivity, network diagnostics, and network security. If a low-level function is detected, the MP MAC will execute the function 531. For example, computer 103 may receive a packet from another node in the mesh network. After processing the packet, MP MAC 303 may determine that the packet needs to be forwarded to another node in the network and subsequently the transceiver 305 is instructed to forward the packet to the destination node in the mesh network.

After executing any low-level functions, if higher level functions need to be executed, the packet is sent to the multiplexor 307 where it is tagged 533 to designate it as a packet arriving from the mesh network. The packet is then directed to the mesh sections of IM driver 219 in step 537. The interface layer 206 can direct 539 the packet to the mesh portion of the API 205. The API 205 then notifies the package to its intended destination 543 in computer 103. As mentioned earlier, the destination may be part of the user-interface 203, an application 201, or within the OS of computer 103. Furthermore, computer 103 may execute low-level and high-level functions at the same time or at different times.

Conversely, in step 519, if a packet is determined to have arrived from a node in the infrastructure network, the packet is passed 523 to the STA MAC 301. By default, the STA MAC 301 may be configured without the ability to perform low-level functions; however in some embodiments, a user may configure the STA MAC 301 to perform low-level functions in the infrastructure network if desired. After processing the received packet, the packet is passed on to the multiplexor 307 and subsequently the infrastructure adapter 217. As described earlier, the MAC tags 527 the packet as having arrived from the infrastructure network so that multiplexor can direct it to the appropriate adapter 529. The infrastructure adapter 217 selects the appropriate modules in the interface layer 206 to further process and subsequently transfer 541 the packet to the infrastructure network portion of the API layer 205. The API 205 then notifies the package to its intended destination 545 in computer 103.

Figure 6:
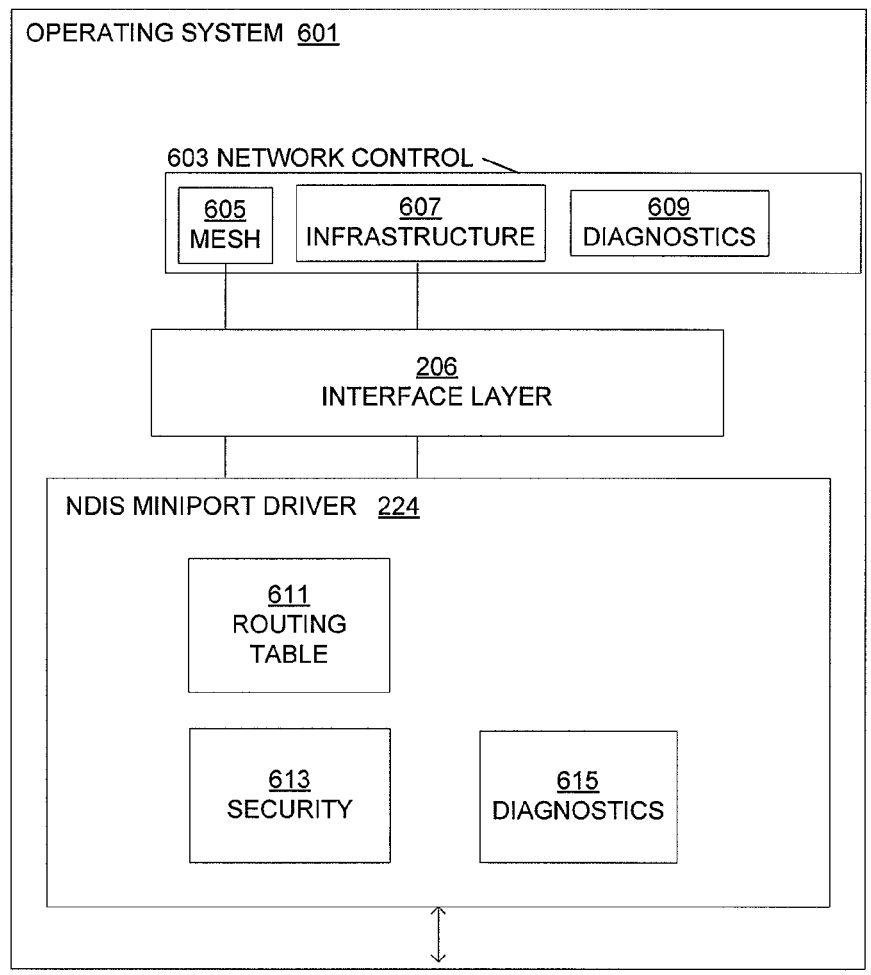
FIG. 6 is a generalized block diagram illustrating an interface between high-level layers and low-level layers of an operating system responsible for managing network connections, according to various embodiments of the invention.

As has been described herein, several components within an OS are utilized for implementing computer networking. These components can be grouped according to the nature of functions they perform. In FIG. 6, three groups or tiers of components with an OS 601 are shown. Low-level functions, as described earlier, can be executed by the NDIS miniport layer 224. In an illustrated embodiment of the invention, the NDIS miniport layer 224 comprises components such as a routing table 611, a security unit 613, and a diagnostics unit 615. Low-level functions are not necessarily limited to execution by these components and may involve other components in the OS 601 or miniport driver 224. The routing table 611, security unit 613, and diagnostics unit 615 can be connected to each other and help execute the tasks performed by the MACs, management unit, transceiver, and multiplexor. In some embodiments, NDIS miniport driver 224 may be configured to perform these low level functions without interaction from the OS or higher level components.

The routing table 611 contains information regarding network routes and destinations as is well-known to one of ordinary skill in the art. The information includes and is not limited to a network ID, a host ID, and a default mode. This information may be used to determine whether a received packet is to be forwarded to other nodes in a mesh network, provided to higher levels within the networking stack for processing or both.

The security unit 613 contains information related to security protocols and passwords for accessing and connecting to other networks. For example, one or more passwords or may be needed for a user of computer 103 to communicate with another user connected to the mesh network and/or the infrastructure network. If multiple users use computer 103, each may have a unique password or protocol setting for connecting to other networks. Information on these passwords and protocols is stored in the security unit 613, The diagnostics unit 615 can monitor the connectivity with other networks. The diagnostics unit 615, for example, can monitor traffic flowing in a particular data communication link and determine if there is a problem in the link. The diagnostics unit 615 can also determine the cause of a problem and provide instructions to fix a network connectivity problem.

In addition to the low level functions supported with NDIS miniport driver 224, higher level functions may be supported within a network control unit 603. These higher level control functions may be based on commands sent to or received from NDIS miniport driver 224. These commands my be implemented using OIDs or in any other suitable way. The network control unit 603 performs high level functions including but not limited to executing application or registry-specific commands and outputting received data/instructions to the user. The network control unit also implements the routing logic associated with higher layer protocols such as TCP/IP as well as advertisement of services, which include associated peripheral functions such as printing, scanning, storage, as well as connectivity to the Internet. The network control unit 603 can also allow a user of computer 103 to trouble-shoot and configure the settings for connecting or receiving/transmitting packets to the mesh and/or infrastructure networks and to specific users in the networks. For example, OIDs may be defined to allow diagnostics module 609 to poll NDIS miniport driver 224 to provide status information used for network diagnostics.

Network control functions may similarly be partitioned between high level and low level functions. In an illustrated embodiment of the invention, the network control unit includes a mesh control unit 605, infrastructure control unit 607, and a diagnostics unit 609. High level functions originating or designated for the mesh network are implemented in the mesh unit 605 where as high level functions originating or designated for the infrastructure network can be implemented in the infrastructure unit 607. For example, these high level network control units may generate OIDs representing high level commands, such as connect or disconnect. More detailed steps required to establish a connection may be implemented within the MAC or other lower level components for the associated network.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device, comprising:
    a memory and a processor that respectively store and execute instructions, including instructions for causing the computing device to perform operations, the operations including:
        interfacing the computing device to a first network via a first network interface component;
        interfacing the computing device to a second network via a second network interface component;
        with a first media access control (MAC) component:
            controlling a radio in accordance with a first protocol; and
            receiving messages from the first network from the radio;
        with a second media access control (MAC) component:
            controlling the radio in accordance with a second protocol; and
            receiving messages from the second network from the radio;
        selectively routing messages from the first MAC component and messages from the second MAC component to either the first network interface component or the second network interface component based on information associated with the MAC component through which particular messages were received;
        originating a first message to be sent through an access point for the first network via at least one bridging device of the second network;
        bridging a second message that is to be sent through the access point by receiving the second message over the second network and retransmitting the second message to the access point via the at least one bridging device; and
        bridging a third message that is to be sent through the access point by receiving the third message over the second network and retransmitting the third message to the access point.

2. The computing device of claim 1, wherein:
    the first MAC component, the second MAC component, and the multiplexing component are implemented within a network driver.

3. The computing device of claim 2, wherein the operations also include responding to a command configuring a mesh network routing table.

4. The computing device of claim 3, wherein the operations also include responding to a command resetting the first MAC component without resetting the second MAC component.

5. The computing device of claim 1, wherein the first network is an infrastructure network and the second network is a mesh network.

6. The computing device of claim 1, wherein the operations also include:
    forwarding the third message from the second MAC component to the first MAC component.

7. The computing device of claim 1, wherein the operations also include:
    obtaining diagnostic information from a miniport driver using at least one object identifier, wherein the diagnostic component is within an operating system of the computing device, and wherein the operating system is adapted to generate the at least one object identifier.

8. The computing device of claim 1, wherein the computing device is operable to maintain concurrent connections with the first network and the second network over the radio.

9. A method of enabling communications between a computing device and at least two networks, the method comprising:
    interfacing the computing device to a first network via a first network interface component;
    interfacing the computing device to a second network via a second network interface component;
    with a first media access control (MAC) component:
        controlling a radio in accordance with a first protocol; and
        receiving messages from the first network from the radio;
    with a second media access control (MAC) component:
        controlling the radio in accordance with a second protocol; and
        receiving messages from the second network from the radio;
    selectively routing messages from the first MAC component and messages from the second MAC component to either the first network interface component or the second network interface component based on information associated with the MAC component through which particular messages were received;
    originating a first message to be sent through an access point for the first network via at least one bridging device on the second network;
    bridging a second message that is to be sent through the access point by receiving the second message from the second network and retransmitting the second message to the access point via the at least one bridging device; and
    bridging a third message that is to be sent through the access point by receiving the third message from the second network and retransmitting the third message to the access point.

10. The method of claim 9, wherein:
the first MAC component and the second MAC component are components of a network driver.

11. The method of claim 9, wherein the first network is an infrastructure network and the second network is a mesh network.

12. The method of claim 9, wherein the method further comprises:
receiving the third message from the second network via the radio and the second MAC component;
forwarding the third message from the second MAC component to the first MAC component via a routing component of a network driver; and
retransmitting the third message to the access point via the first MAC component and the radio.

13. The method of claim 9, wherein the method further comprises:
maintaining concurrent connections with the first network via the radio and with the second network via the radio.

14. The method of claim 9, wherein the method further comprises:
configuring a mesh network routing table associated with a network driver.

15. The method of claim 9, wherein the method further comprises:
responding to a command requesting an identification of the first MAC component with an identification of the first MAC component; and
responding to another command requesting an identification of the second MAC component with an identification of the second MAC component.

16. A computer-storage device having computer-executable instructions for controlling a wireless device to communicate over at least two networks, the computer-executable instructions, when executed, cause the wireless device to:
originate a first message to be sent through an access point for a first network via at least one bridging device on the second network, by:
receiving the first message at a second media access control (MAC) module from an application on the wireless device via a second interface module; and
transmitting the first message from the second MAC module to the at least one bridging device via a radio;
bridge a second message that is to be sent through the access point by receiving the second message over the second network and retransmitting the second message to the access point via the at least one bridging device, by:
receiving the second message by the second MAC module from the radio; and
retransmitting the second message from the second MAC module to the at least one bridging device via the radio; and
bridge a third message that is to be sent through the access point by receiving the third message over the second network and retransmitting the third message to the access point, by:
receiving the third message by the second MAC module from the radio;
routing the third message from the second MAC module to the first MAC module; and
transmitting the third message from the first MAC module to the access point via the radio.

17. The computer-storage device of claim 16, wherein:
the first MAC module and the second MAC module are modules of a network driver.

18. The computer-storage device of claim 16, wherein the first network is an infrastructure network and the second network is a mesh network.

19. The computer-storage device of claim 16, wherein the computer-executable instructions, when executed, also cause the wireless device to:
maintain connections with the access point via the radio and with the second network via the radio.

20. The computer-storage device of claim 16, wherein the computer-executable instructions cause the wireless device to bridge the third message, also by:
associating the third message information that indicates that the third message was received via the second network;
transferring the third message from the second MAC module to a multiplexing module; and
transferring the third message from multiplexing module to the first MAC module.

* * * * *